(12) United States Patent
Burns (10) Patent No.: US 6,647,771 B2
(45) Date of Patent: Nov. 18, 2003

(54) EXTERNAL PRESSURE DISPLAY FOR VEHICLE TIRES

(75) Inventor: Alan Alexander Burns, Portola Valley, CA (US)

(73) Assignee: MLHD, Inc., Portola Valley, CA (US)

( * ) Notice: Subject to any disclaimer, the term of this patent is extended or adjusted under 35 U.S.C. 154(b) by 152 days.

(21) Appl. No.: 09/927,736

(22) Filed: Aug. 10, 2001

(65) Prior Publication Data

US 2002/0101339 A1 Aug. 1, 2002

Related U.S. Application Data

(60) Provisional application No. 60/228,941, filed on Aug. 30, 2000.

(51) Int. Cl.[7] .......................... G01M 17/02; B60C 23/02
(52) U.S. Cl. ........................................... 73/146; 340/442
(58) Field of Search ................................ 73/146, 146.2, 73/146.3, 146.4, 146.5, 146.8; 340/206.01, 442

(56) References Cited

U.S. PATENT DOCUMENTS

| | | | | |
|---|---|---|---|---|
| 3,876,286 A | * | 4/1975 | Deutscher et al. ............ 349/23 |
| 4,114,990 A | * | 9/1978 | Mash et al. .................. 349/193 |
| 4,128,496 A | * | 12/1978 | Cole, Jr. et al. ......... 252/299.1 |
| 4,307,928 A | * | 12/1981 | Petlock, Jr. ................. 439/824 |
| 4,768,862 A | * | 9/1988 | McAdams .................... 349/23 |
| 5,103,670 A | * | 4/1992 | Wu et al. ................... 73/146.8 |
| 5,412,500 A | * | 5/1995 | Fergason ..................... 349/76 |
| 5,717,135 A | * | 2/1998 | Fiorletta et al. ............ 73/146.5 |
| 5,798,807 A | * | 8/1998 | Prehn ........................... 349/76 |
| 5,960,804 A | * | 10/1999 | Cooper et al. ............ 134/56 D |
| 6,053,038 A | * | 4/2000 | Schramm et al. .......... 73/146.5 |
| 6,082,170 A | * | 7/2000 | Lia et al. ..................... 73/1.57 |
| 6,520,006 B2 | * | 2/2003 | Burns .......................... 73/146 |

* cited by examiner

*Primary Examiner*—Edward Lefkowitz
*Assistant Examiner*—Andre Allen
(74) *Attorney, Agent, or Firm*—David E. Newhouse (57) ABSTRACT

A magnetically coupled pressure display system particularly adapted for pneumatic tires of motor vehicles includes pressure transducer coupled for rotating a magnet field source within the tire and an external magneto-optical liquid crystal display attached to or integrally incorporated into the exterior sidewall of the tire for visually indicating pressure within the tire responsive to the orientation of the magnetic field source within the tire. The external display exploits the magneto-optical effects of liquid crystals and can be conformally and permanently attached to the outer tire sidewall surface. Elements (pixels) comprising the display have selective light polarization properties globally determined by direction (orientation) of the magnetic field each experiences, the primary component of which is that provided by the magnetic field source rotated by the pressure transducer within the vehicle tire.

27 Claims, 7 Drawing Sheets

EXTERNAL PRESSURE DISPLAY FOR VEHICLE TIRES

CROSS-REFERENCES TO RELATED APPLICATIONS

This Application is a continuation of Provisional Application No. 60/228,941 filed Aug. 30, 2000.

BACKGROUND

1. Field of Invention

This invention relates to gauging tire pressure without connection to the tire interior, specifically using rotating permanent magnets and a display device that uses magneto-optical effects in liquid crystals or other materials to respond to magnetic field direction.

2. Description of Prior Art

Fluor Hanford, Inc. has developed a magnetically-coupled pressure readout based on Bourdon-tube principles. Bourdon-tube gauges are fragile, complex, and produce relatively weak forces. Accordingly, Bourdon tube mechanisms are not well suited for supporting appreciable magnet masses and for overcoming friction. In fact, forces generated by the interaction of the earth's magnetic field with a supported magnet can exceed those available from Bourdon tube mechanisms. For readout, the Fluor Hanford device employs a conventional, horizontally oriented, gravity stabilized magnetic compass needle supported by a single-jewel suspension. Accordingly, the Bourdon tube mechanism is necessarily vertically oriented and this type of device is only suited for stationary applications. Additionally, the Flour Hanford device does not include a means for compensating for errors due to extraneous magnetic fields and does not include a means for extending the operating distance.

Angular coupling between rotating elements on shafts via magnetic fields is well known. For example, U.S. Pat. No. 5,382,792 to Hurst et al, describes a coupling mechanism wherein permanent magnet pairs are incorporated into coaxial shafts to provide an instantaneous indication of the orientation of a rotating shaft internal to a motor vehicle engine. Such coupling mechanisms employ multiple permanent magnets, oriented pole-face to pole-face. In these types of devices, magnetic coupling between the pole faces of paired permanent magnets aligns the "output" shaft with the "input" shaft. To be effective, such mechanisms require narrow gaps between the pole faces of the respective magnets. These types of devices are hermetically encapsulated for protection from environmental debris and require penetration of the engine wall.

U.S. Pat. No. 3,777,565 to Munier et al. describes a sealed water or fluid meter with continuously rotating permanent magnets driven by impellers on input shafts magnetically coupled to magnets on outputs hafts for inducing synchronized rotation. The rotation per unit time of the output shaft indicates the flow rate. Angular displacements (errors) between the "input" and "output" shafts are tolerated and even increase torque coupling from the input magnet to the output magnet.

Numerous devices include mechanisms moving a permanent magnet in response pressure or other force to induce a sensed effect in a material responsive to variation in magnetic field strength. For example, U.S. Pat. No. 4,006,402 to Mincuzzi, U.S. Pat. No. 4,843,886 to Koppers, et al, and U.S. Pat. No. 4,627,292 to Dekrone, each describe a device based on either magnetoresistance and magnetic saturation. U.S. Pat. No. 4,339,955 to Iwasaki describes a mechanism that exploits variation in the incremental permeability of a magnetically soft material. Devices based on the sensing the strength or flux of a magnetic field rather than field direction typically are very sensitive to changes in spacing, small misalignments, and extraneous magnetic fields. Accordingly, such devices generally require careful and extensive calibration before measurements are made.

U.S. Pat. No. 4,866,982 to Gault describes a tire pressure monitoring system where a stationary Hall-effect sensor measures spacing between a fixed magnet and a second magnet moveable in response to a linear pressure actuator. Changes in spacing between the magnets affect features of the combined magnetic field pattern. Variation in the combined pattern is determined from signal waveforms generated as the spaced magnets, rotating with a wheel, sweep by a stationary sensor. This device requires close coupling between magnet and sensor and penetration into the pressurized interior of the tire and rim.

U.S. Pat. No. 5,814,725 to Furuichi et al. describes a mechanism that penetrates a tire rim wherein a piston-driven screw rotates a permanent magnet. The strength of the magnetic field is detected by a stationary Hall-effect sensor that is mounted transversely to the magnet rotation axis. This type of device typically shares the same problems as the other devices that depend on sensing magnetic field strength.

U.S. Pat. No. 5,047,629 to Geist describes a hermetically sealed mechanism for sensing linear displacements of a ferromagnetic armature (e.g., a single turn in a coil spring) according to the attractive force on freely rotating magnet. Disadvantages inherent in this type of device relate to the small distances required between the armature and the magnet, to the small amount of rotational displacement of the magnet produced, and to inadvertent magnetization of the armature.

Other examples of remote pressure reporting mechanisms involve changes in electromagnetic induction or inductive coupling between active elements. For example, U.S. Pat. No. 5,455,508 to Takahashi utilizes a form of time-varying (alternating current) electrical excitation. Disadvantages of these types of devices relate to the need to provide a source of operating power within the pressure container and to inadvertent production of eddy currents in nearby conductive materials that will distort the desired field. These types of devices do not sense magnetic field direction.

Still other concepts of remote pressure sensing involve a change the state indicator responding a preset pressure level. For example, U.S. Pat. No. 3,946,175 to Sitabkhan describes switching a magnetically susceptible reed in response to pressure actuated displacement of a magnet. U.S. Pat. No. 5,542,293 to Tsuda et al. describes a conventional bellows actuated mechanism that uses a fixed and a moveable magnet to switch the orientation of a third magnet. U.S. Pat. No. 5,717,135 to Fioretta et al. describes use of magnetic coupling to switch the state of a transducer from producing to not producing a signal. These types of mechanisms are incapable of producing a continuous output responsive to pressure.

Other examples of remote monitoring of vehicle tire pressure involve wireless or telemetric transmission of data. For example, U.S. Pat. No. 5,960,804 to McClelland describes a radio transmitter that sends data collected and stored in a memory device within a tire to an external receiver. This active device requires a source of electrical energy (a battery) inside the tire. Alternatively, U.S. Pat. No. 6,053,038 to Schramm et al. proposes a scheme where an external oscillator circuit generates electromagnetic signals coupling to and energizing a second oscillator within the tire, which changes state responsive to tire pressure and/or other sensed parameters.

Several mechanisms besides Bourdon tubes have been proposed for converting pressure or force into rotary motion. For example, U.S. Pat. No. 4,307,928 to Petlock describes a helical bellows for imparting rotational displacement when compressed mechanically in order to make an improved electrical contact. A single, high pitch helical lead is employed because the desired rotational translation is small. U.S. Pat. No. 5,103,670 to Wu describes the use of a helical screw to convert linear displacement from a conventional bellows to actuate a directly viewed rotary dial or pointer. U.S. Pat. No. 6,082,170 to Lia et al. describes a blood pressure apparatus that uses a diaphragm bellows and a compressible helical ribbon spring to rotate a dial pointer. None of these types of device employs magnetic coupling for remote sensing.

U.S. Pat. No. 3,876,286 to Deutscher et al. describes orienting nematic liquid crystals in response to electric and magnetic fields and hence affecting light transmission in electrically controlled liquid crystal cells. U.S. Pat. No. 4,128,496 to Cole et al. describes various dichroic liquid crystal compositions for use in displays.

U.S. Pat. No. 5,412,500 to Fergason describes a method for continuously rotating the direction of linearly polarized light by a liquid crystal cell in response to an electrical input across the cell. This type of device employs quarter wave phase retardation means and a polarization analyzer to effect polarization rotation and requires monochromatic light. The degree of polarization rotation is controlled by the strength of the electrical field, which has a fixed direction.

U.S. Pat. No. 5,798,807 to Prehn proposes a multi-element device for projecting temporally modulated images. In this type of device the degree of polarization rotation is controlled by the strength of the electrical, magnetic, or mechanical impetus, not the orientation of the impetus.

U.S. Pat. No. 4,114,990 to Mash et al. describes a cell filled with a cholesteric (i.e., chiral nematic) liquid crystal for rotating the polarization of incident plane light in response to an electrical field applied transversely across the cell. A simulated pointer meter is to be produced by progressively varying the orientation of a polarizing layer over the cell. This type of device depends on controlling (by means of the electric field strength) the balance between homeotropic alignment of the liquid crystal at one inner cell surface and parallel homogeneous alignment at the other inner cell surface, which affects the degree of helical twist of the cholesteric liquid crystal.

U.S. Pat. No. 4,768,862 to McAdams describes a liquid crystal cell employing a uniform transverse magnetic field to switch the linear polarization orientation of an incident light beam in a wavelength selective fashion. In this type of devic, the orientation of the liquid crystal director is switched from twisted nematic to homeotropic by increasing the strength of the transverse magnetic field.

U.S. Pat. No. 4,214,819 to Pohl et al. proposes using a combination of electric and magnetic fields to increase the switching speed of an electro-optical liquid crystal cell and controlling the color of a display. This type of device uses predetermined electric and magnetic field directions and is controlled by varying the electric field strength.

SUMMARY OF THE INVENTION

The invented magnetically coupled gauge comprises a sender unit with a pressure sensor or other property transducer coupled for rotating a magnetic field source and a magneto-optical liquid crystal display unit responding to the direction of the magnetic field produced at a distance. In particular, the display unit exploits the magneto-optical effects of liquid crystals to indicate direction of the magnetic field provided by the sender unit.

The magneto-optical liquid crystal display unit preferably is a thin, flexible patch comprising a liquid crystal cell, and is positioned such that the field produced by the rotating magnet of the sender unit has a substantial component in the plane of the cell. Individual pixels comprising the display have predetermined light polarization properties different from one another. The display unit provides a continuous response indicating direction of a vector sum of the magnetic fields experienced by the display as a whole at any particular location and time, the primary component of which is always determined by the rotated magnetic field source of the sender unit.

A particular embodiment of invented magnetically coupled gauge is intended to visually display externally, an indication of pressure within vehicle tires and other pressure vessels and/or vacuum vessels quickly and cleanly, without any need for penetration into or breach of the pressure vessel.

Advantages

The primary advantage of invented gauge the relates both to the ease of precisely controlling and then sensing magnetic field direction with magneto-optical liquid crystals as opposed to sensing and parameterizing flux or strength of a magnetic field.

Other advantages of the invented magneto-optical liquid crystal pressure gauge is its simplicity robustness, and an almost universal utility for visually indicating pressure within both pressurized and evacuated vessels, including a pneumatic vehicle tires.

Still other advantages of the invented magneto-optical liquid crystal pressure gauge is that it is passive, and capable of providing an indication of pressure within a pneumatic tire or sealed vessel using ambient light.

A particular utility of the invented magneto-optical liquid crystal pressure gauge is that dangerously low pressure of motor vehicle tires, particularly the multiple axle, tire wheels of large trucks, can be easily determined by visual inspection, rather than measurement, substantially enhancing traffic safety.

Other aspects of the invented magneto-optical liquid crystal pressure gauge relate to economical, direct, non-contaminating pressure indications.

Still other aspects of the invented magneto-optical liquid crystal gauge are associated with a passive display accomplished by prior orientation of pixels of magneto-optical liquid crystal display for placement within an external magnetic field that changes direction responsive to pressure or other transduced property within a closed vessel.

Other features of the invented magneto-optical liquid crystal gauge is that the display responding to the magnetic field can be essentially independent of the wavelength of the light. On the other hand, the display can respond to magnetic field direction with changes in color.

Still other features of the invented magneto-optical liquid crystal gauge relate to mechanisms for precise control of liquid crystal display systems with a magnetic field.

Another related feature of the invented magneto-optical liquid crystal gauge relates to minimization magnetic flux or field strength effects on the liquid crystal display systems.

Still further objects and advantages will become apparent from a consideration of the ensuing description and accompanying drawings.

| Reference Numerals In The Drawings | | | |
|---|---|---|---|
| 2 | pressure sender unit | 4 | pressure display unit |
| 10 | sender outer case | 12 | pressure bladder |
| 12A | pressure bladder | 14 | spiral actuating spoke |
| 14A | spiral actuating spoke | 16 | shaft |
| 16A | shaft | 18 | sender magnet |
| 20 | index mark | 22 | thin optical structure |
| 24 | virtual pointer | 26 | magnetic field |
| 28 | dial scale | 30 | display symbol |
| 32 | spiral reinforcing spring | 34 | bladder wall |
| 36 | tire | 38 | wheel |
| 40 | reflecting layer | 42 | polarizing layer |
| 44 | center layer with liquid crystal | 46 | polarizing regions or pixels |
| 48 | incident and reflected light | 50 | polarizer orientation |
| 52 | liquid crystal | 54 | magnetic field vector |
| 56 | first polarizing layer | 58 | center layer with liquid crystal |
| 60 | second polarizing layer | 62 | reflecting layer |
| 64 | liquid crystal | 66A | liquid crystal director |
| 66B | liquid crystal director | 68 | polarizing pixels |
| 70 | incident and reflected light | 72A–B | linear polarizer orientation |

DESCRIPTION—PREFERRED EMBODIMENT

Figure 1:
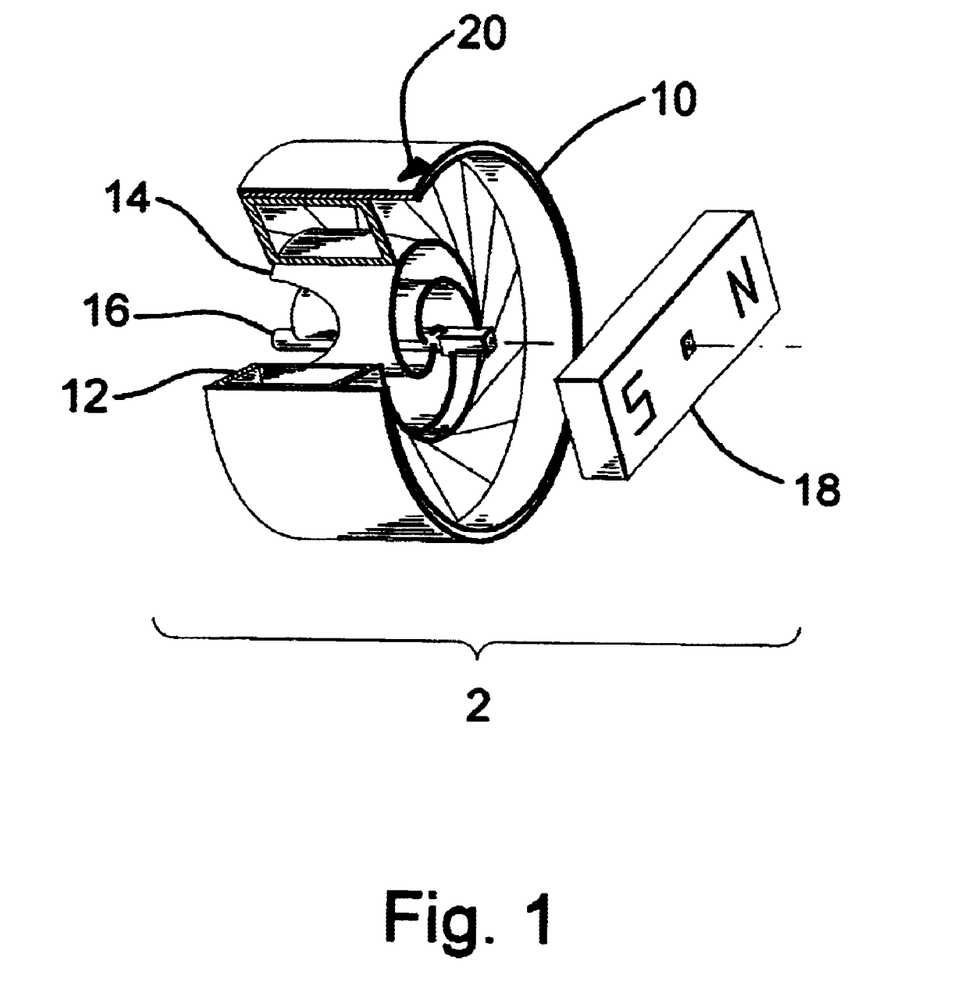
FIG. 1 is an exploded and cut away perspective view of a magnetically coupled pressure sender with spiral actuating spokes.

FIG. 1 shows a magnetically coupled pressure sender unit 2. Its principal elements are an outer case 10, a permanently hermetically sealed annular pressure bladder 12, spiral actuating spokes 14, and a shaft 16. Shaft 16 supports a sender permanent magnet 18, which is rigidly attached to and rotates with shaft 16. If three or more spokes 14 are employed, shaft 16 can "float" freely, entirely supported by spokes 14, without bearings. Alternatively, shaft 16 could also be supported by bearings (not shown). Case 10 prevents bladder 12 from appreciably expanding outward and can be used to attach the pressure sender to other objects, such as the inner sidewall of a tire. Case 10 may be part of bladder 12. The entire sender is placed completely inside a pressure vessel (not shown), such as a tire. There is no pressure communication except through external force on bladder 12. Bladder 12 may be pressurized, preferably to ambient pressure, or hold a vacuum. Permanent magnet 18 is depicted as being rectangular, but could have any shape so long as a dipole-like magnetic field is produced in the direction shown. Spiral spokes 14 are flexible (but resist stretching) and may be metallic or be comprised of an elastomeric or other material. Bladder 12 is described in more detail in connection with FIG. 3 below. Materials comprising the sender (except for the magnet itself) are preferably non- or weakly-magnetic, such as non-ferrous metals, stainless steel, or be non-metallic.

Figure 2:
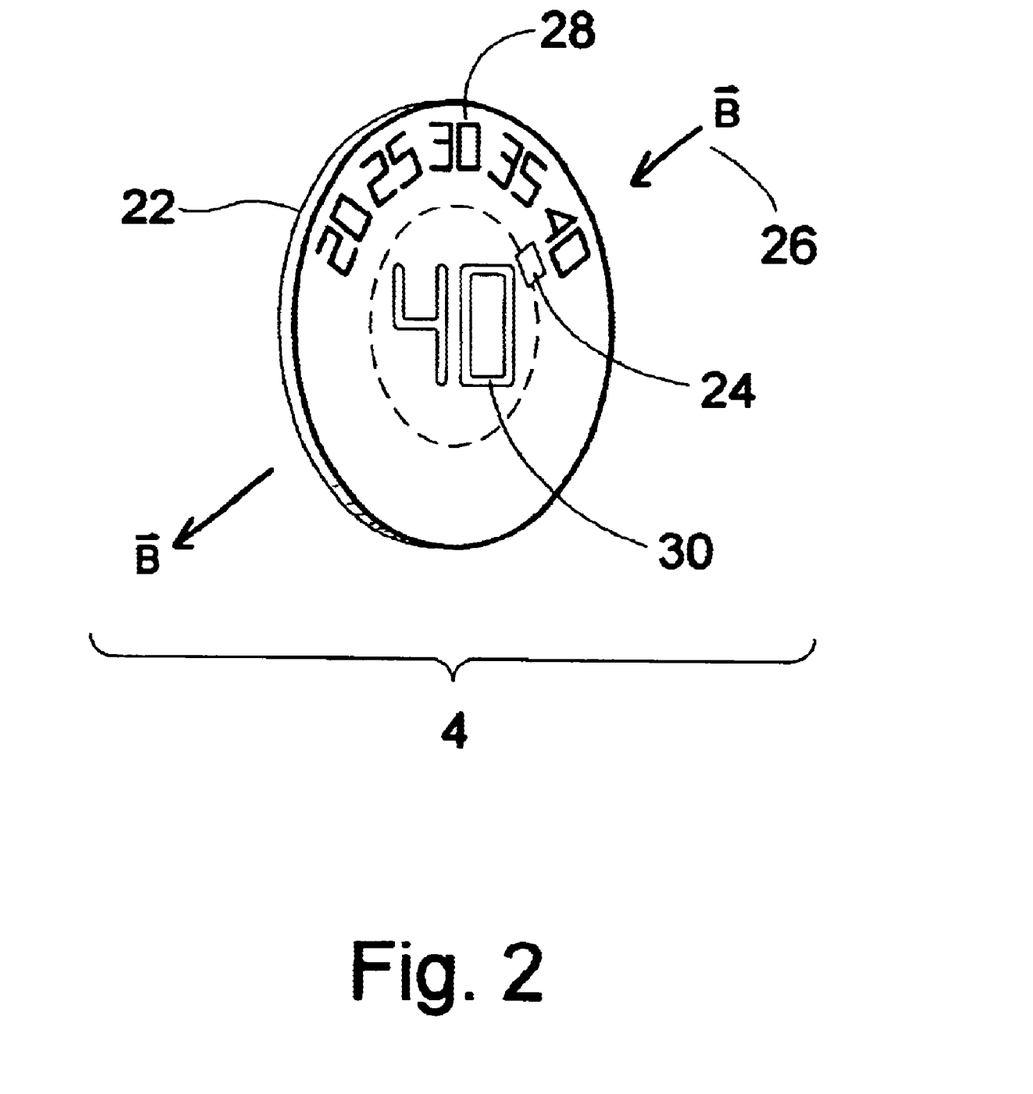
FIG. 2 is a perspective view of a thin magnetically coupled display.

FIG. 2 shows a thin-film, conformal, magnetically coupled pressure display unit 4. Display unit 4 is comprised of a thin optical structure 22 whose light transmission and/or reflection properties respond to the direction of an external magnetic field 26. One display possibility is a virtual pointer 24 that rotates with the direction of the magnetic field in the plane of display unit 4 to indicate pressure marked on dial scale 28. Virtual pointer 24 is a segment of optical structure 22 with greater or lesser light transmission than the average over the structure. An alternative display approach is to make the dial scale markings themselves more or less transmissive as the component of the magnetic field in the plane of display unit 4 rotates, so that the marking corresponding to the pressure is the only one visible. A further display alternative is to cause all or part of the display to change color. A color-changing display can indicate dangerously low or high pressure. A visible pressure display symbol 30 can be made to change as the magnetic field rotates in response to pressure changes. This may be accomplished by segmenting symbol 30 into pixels or regions with varying polarization direction properties. While FIG. 2 illustrates several types of displays, a combination of displays, including all those shown or suggested in FIG. 2, and the above description may be used simultaneously.

Figure 3:
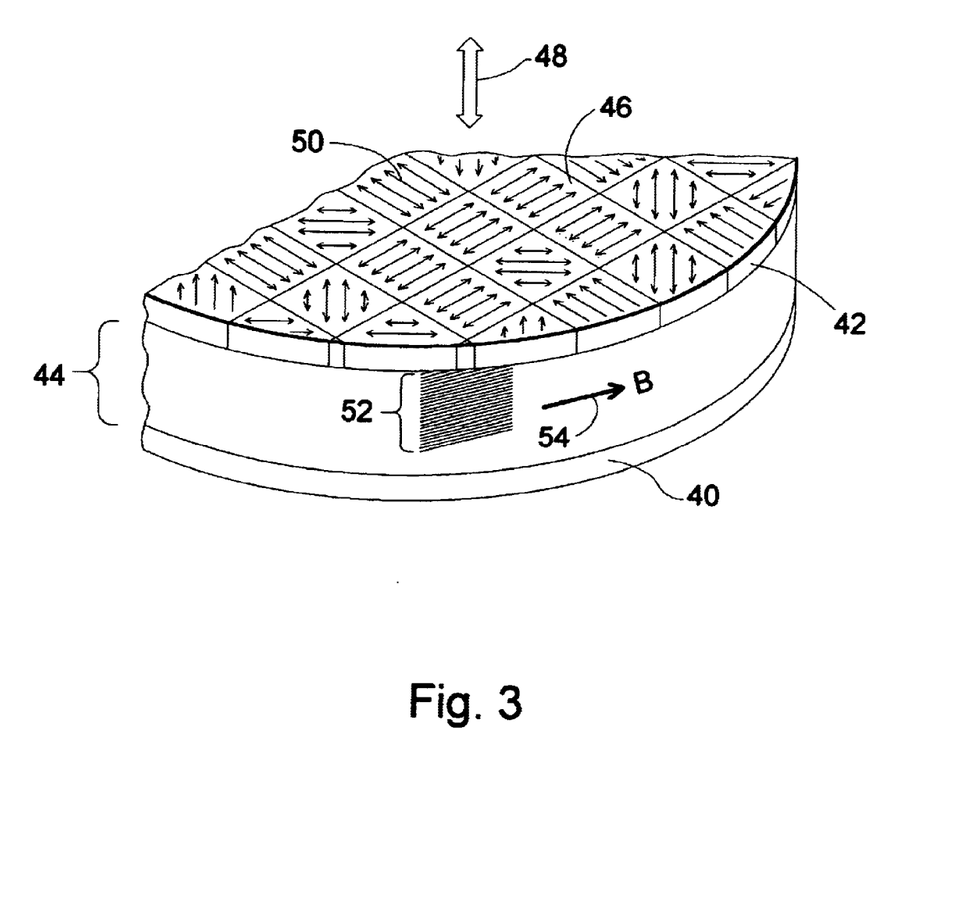
FIG. 3 is a perspective cross section through a magneto-optical LCD employing global rotation of a dichroic liquid crystal and a single polarizer.

Optical structure 22 is similar in appearance and construction to a typical conventional LCD cell that exploits the electro-optical effect. Various embodiments are possible. FIG. 3 illustrates the preferred embodiment, which comprises a reflecting layer 40, a polarizing layer 42, and a center layer 44 filled with a liquid crystal 52 having dichroic (i.e., polarization dependent) absorption properties. Liquid crystal 52 is preferably a calamitic (nematic or smectic) mixture within which a "guest" dichroic dye is dissolved. Discotic liquid crystal molecules may be added to liquid crystal 52 to improve magnetic responsivity. Ferronematic compounds may be employed to enhance magnetic response as well. Liquid crystal 52 is also weakly anchored to the surfaces of layers 40 and 42 with no preferred orientation. Weak anchoring and a relatively wide spacing (tens of micrometers) between layers 40 and 42 are desirable in order to promote alignment of the director of liquid crystal 52 with an external magnetic field 54. Magnetic field 54 should have a substantial component aligned in the plane of the liquid crystal cell comprised of layers 40, 42, and 44. Magnetic field 54 must be strong enough to overcome the wall anchoring tendencies of liquid crystals (i.e., the Freedericksz effect). While all liquid crystals exhibit the magneto-optical effect as well as the more commonly exploited electro-optical effect, the chosen mixture should have relatively strong magneto-optical properties. Upper layer 42 comprises regions, which may be pixels, 46, each of which possess selectively predetermined light polarizing properties. Regions or pixels 46 linearly polarize natural incident light or block polarized incident linearly polarized light in accordance with polarizer orientation 50. Regions or pixels 46 may be individual polarizers or be a polarizing film applied selectively to a transparent substrate.

Optionally, the ordering of the various layers can be varied. For example, polarizing layer 42 can be replaced by a transparent cover and moved to be in between the liquid crystal layer 44 and reflective layer 40.

Figure 4A:
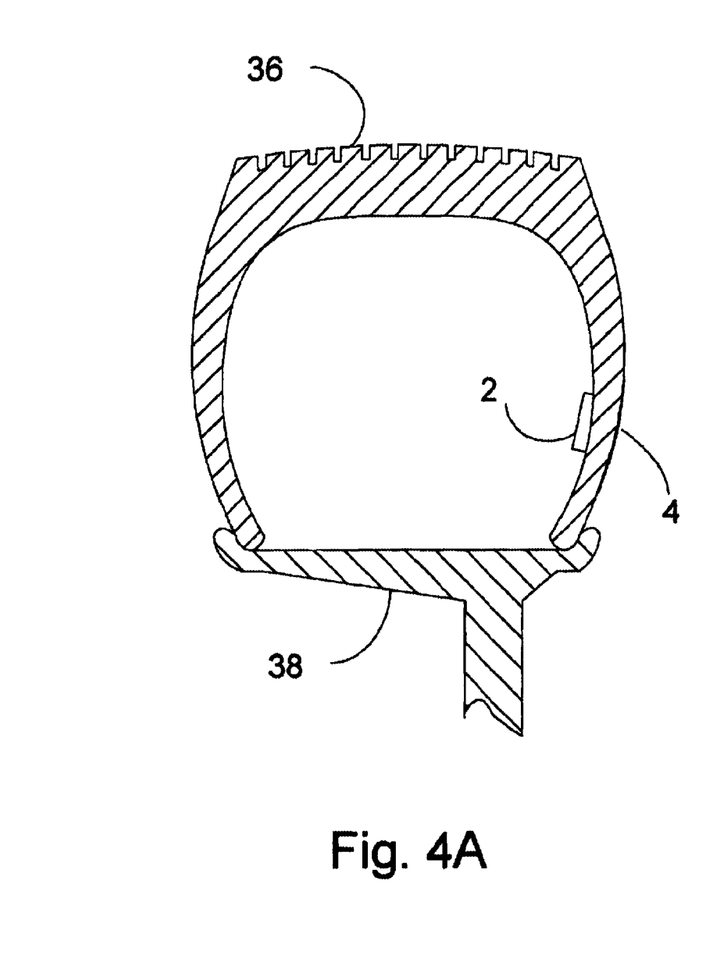
FIG. 4 is a cross section and side view of a tire pressure display.
Figure 4B:
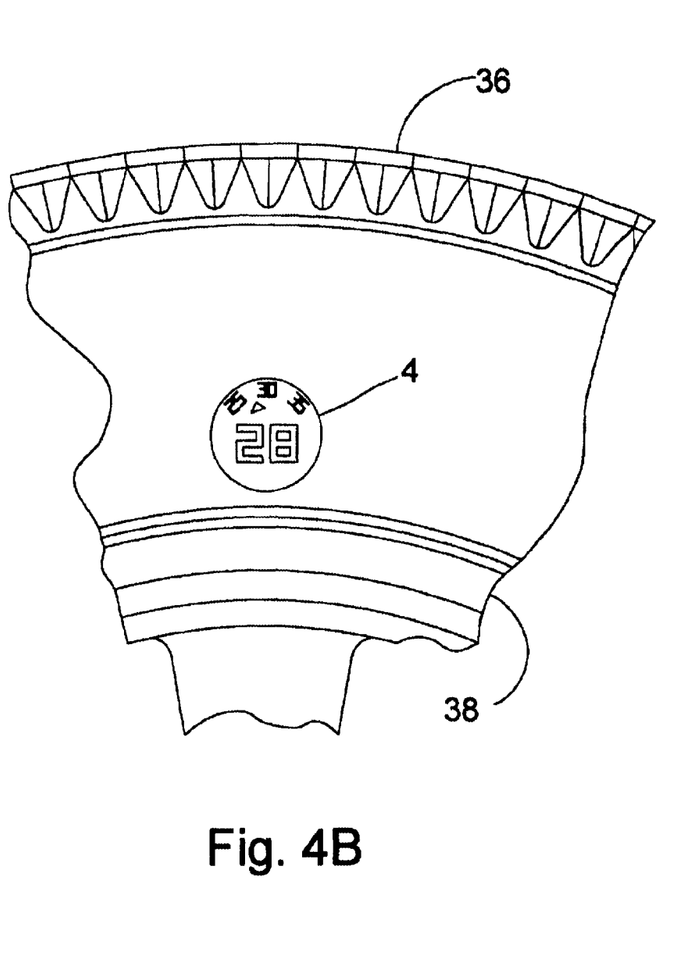

FIG. 4 shows the invented magneto-optical liquid crystal pressure gauge incorporated into a pneumatic tire for vehicles. Sender unit 2 is attached or incorporated (molded) into the inner sidewall of a tire 36. Similarly, pressure display unit 4 is attached or incorporated (molded) into the outer sidewall of tire 36 and is substantially concentric to and aligned with sender 12. Display unit 4 may be recessed into the sidewall as well.

Figure 5:
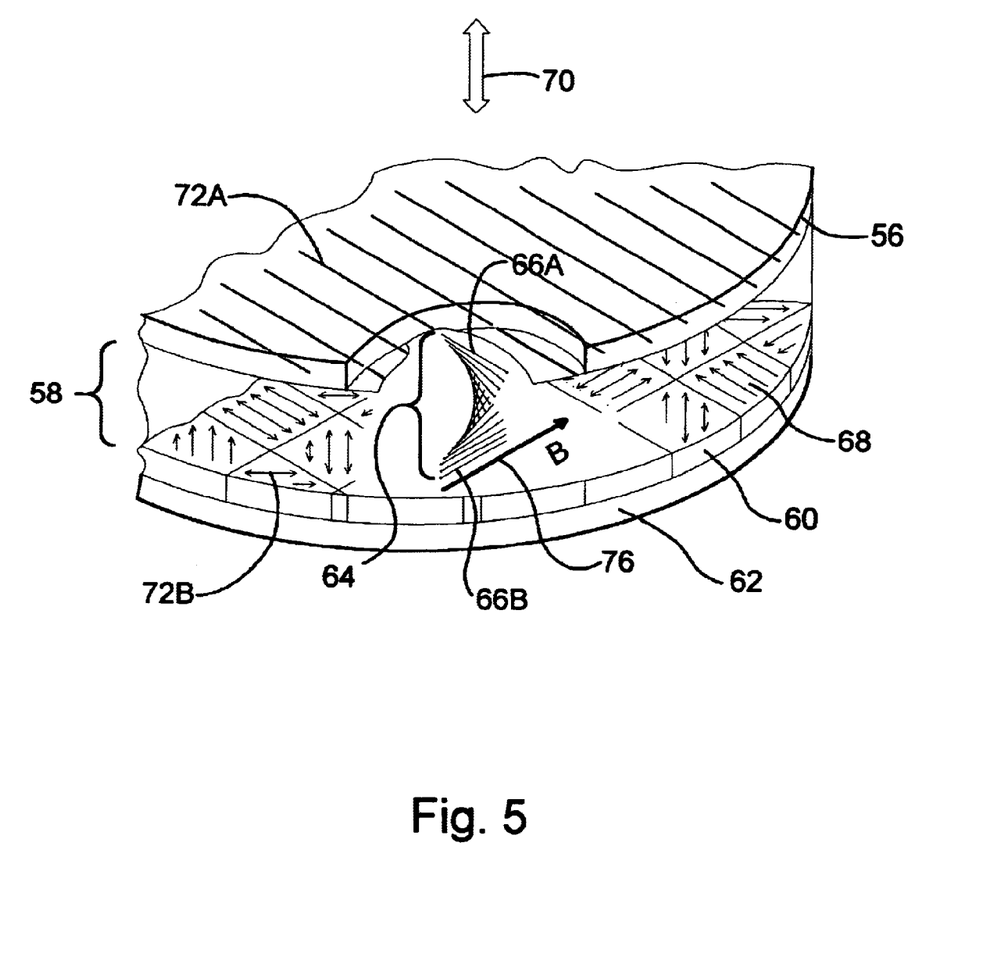
FIG. 5 is a perspective cross section through a magneto-optical LCD employing variably twisting a singly anchored birefringent liquid crystal and dual polarizers.

An alternative embodiment of the liquid crystal display of the invented magneto-optical liquid crystal pressure gauge cell illustrated in FIG. 5 comprises a first linearly polarizing layer 56, a center layer 58 preferably filled with a substantially transparent birefringent calamitic (nematic or smectic) liquid crystal 64, a second linearly polarizing layer 60, and a reflective layer 62. Layer 60 linearly polarizes incident linearly polarized light in accordance with polarizer orientation 72A. Liquid crystal 64 is preferably a mixture capable of rotating the direction of polarization of incident linearly polarized light. Liquid crystal 64 may also incorporate discotic and/or, possibly, chiral liquid crystal components to improve responsivity to magnetic fields. Ferronematic compounds may be employed to enhance magnetic response as well. Liquid crystal 64 is relatively strongly anchored to the inner surface of first polarizing layer 56 so as to have a director 66A substantially aligned at the inner surface of first layer 56 with the orientation of preferred polarized light transmission of first layer 56. Polarizing second layer 60 comprises regions or pixels 68 with predetermined light polarizing properties. Regions or pixels 46 block polarized incident linearly polarized light in accordance with polarizer orientation 72B. Liquid crystal 64 is relatively weakly anchored to the inner surface of second polarizing layer 60 so that a director 66B near the inner surface of layer 60 readily aligns with an external magnetic field 76. Magnetic field 76 should have a substantial component aligned in the plane of the liquid crystal cell comprised of layers 56, 58, and 60. Magnetic field 76 should be strong enough to overcome liquid crystal director wall anchoring tendencies at the inner surface of second polarizing layer 60 and weak enough to avoid breaking the wall anchor at the inner surface of first polarizing layer 56.

The embodiments described in reference to FIGS. 3 and 5 employ reflecting layers 40 or 62 to permit passive operation using incident light. Reflected incident light is selectively blocked or passed to produce a display. Alternatively, transmissive modes of operation may be employed using artificial light sources whereby reflecting layers 40 or 62 are not included in the layered structures. The display is then seen as changes in light transmission through the layered structure.

Figure 6:
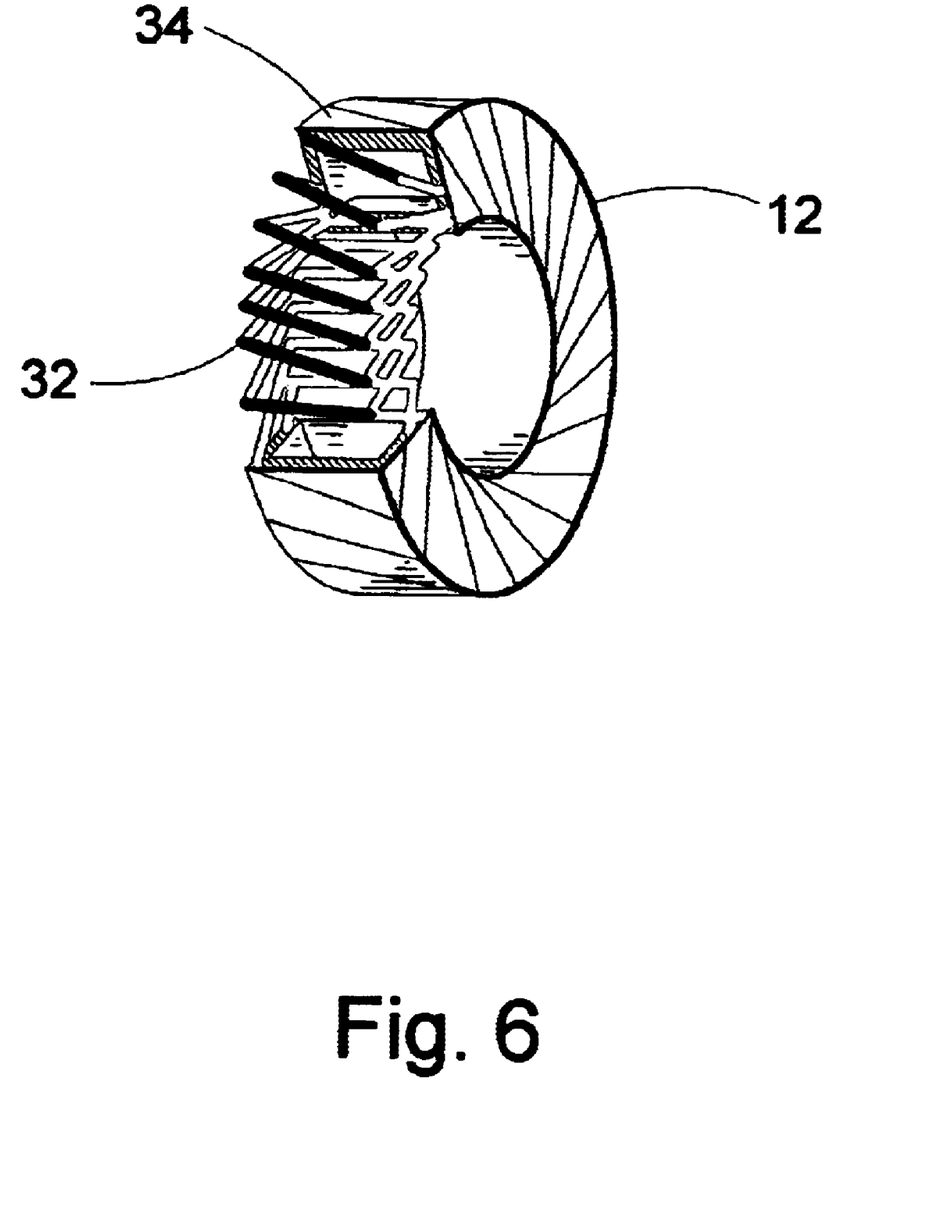
FIG. 6 is an exploded and cut away perspective view of a helical wire-wound pressure bladder.

FIG. 6 depicts an annular pressure bladder 12 that uses an internal or built-in spiral spring 32. Spiral spring 32 provides a restoring force against pressure, and provides side-wall rigidity and general structural integrity. Spring 34 also provides for some rotational displacement of the inner surface of annular bladder 12 with respect to case 10. If bladder 12 is comprised of an elastomeric material, spring 32 may be molded into the walls 34 of bladder 12. Alternatively, bladder 12 could be constructed in the form of an annular bellows (not shown). An annular bellows would have an appearance substantially the same as bladder 12. The side walls of the annular bellows would be corrugated in a spiral pattern to permit contraction (expansion) under external pressure and to produce additional rotation. The corrugations would be continued into the center of the annulus to allow the center to expand (contract) as the side walls contract (expand). Special consideration must be given to accommodate stretching of the bellows material at bends and junctions. Numerous alternative arrangements of bellows corrugation patterns are possible as well. For example, the side walls may have annular corrugations.

Figure 7:
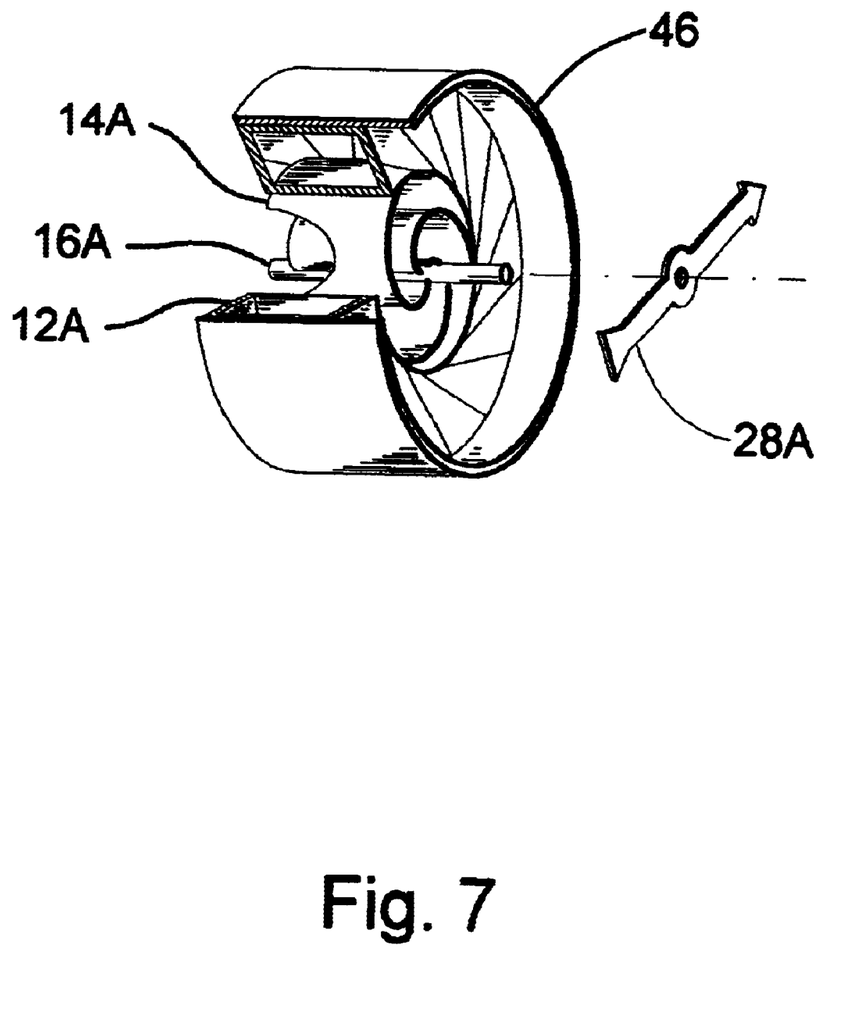
FIG. 7 is an exploded and cut away perspective view of a pressure gauge with spiral actuating spokes.

FIG. 7 shows a pressure gauge with a conventional dial and display. A pressure inlet 44 admits pressure into bladder 12A. Spiral spokes 14A support an otherwise free shaft 16A. A gauge pointer 28A is attached to shaft 16A. Restraining ring 46 opposes expansion of bladder 12A, and may be part of bladder 12A and/or act as the outer case of the pressure gauge. Because increasing pressure causes the inside diameter of bladder 12A to decrease, pre-tension of spokes 14A may be necessary to insure that the spokes "wind up" and turn shaft 16A. Alternatively, a torsion spring (not shown) can be added between shaft 16A and ring 46 to increase the restoring torque on shaft 16A.

Operation of Sender Units

Referring to FIG. 1, increasing pressure in the fluid surrounding the pressure sender causes the inner surface of annular bladder 12 to move outward toward case 10. Case 10 resists the compressive force. The outward movement of the inner surface in turn unwinds straightening spiral spokes 14 rotating shaft 16 and attached permanent magnet 18. Decreasing pressure produces expansion of the inner wall and winds up shortening spiral spokes 14 rotating shaft 16 permanent magnet 18 in the opposite direction. Additional rotational torque responsive to pressure changes (Δp) may also be provided by designing the inner wall of the and end walls of the annular bladder 12 to rotate progressively relative to its outer wall in order to accommodate changes of inner surface diameter. The skill designer should note that the direction of magnet rotation during expansion and contraction can be reversed by reversing the CW or CCW senses of the spoke and bladder spring or bellows corrugation spirals.

Referring to FIG. 6, spring 34 allows bladder 12 to contract providing a torque between its inner and outer radii in a controlled fashion in response to pressure changes. An alternative annular bellows would change shape generating a torque relative to an stationary (anchored) outer or inner annular wall responsive to pressure changes in a similar way.

Referring to FIG. 7, pressure applied at inlet 44 causes bladder 12A to expand, reducing the diameter of its inner surface. This reduction is coupled to shaft 16A, causing it to rotate. The pointer and associated dial operate conventionally. The pointer 28A could also comprise a magnetic field source providing a magnetic field having an axis of symmetry rotating in a particular plane.

Operation of Magneto-Optic Liquid Crystal Display Units

Referring to FIG. 2, the direction of the magnetic field in the plane of pressure display unit 4 produced by the sender magnet 18 at pressure display unit 4 rotates in synchronism with the sender magnet. The position of virtual pointer 24, the markings on dial scale 28, or the value of visible display symbol 30 to change to show the pressure reading as the direction of the magnetic field rotates.

Referring to FIG. 3, incident light 48 is polarized selectively in regions or pixels 46 and passes into dichroic liquid crystal layer 44. The polarized light is attenuated in variable degrees according to the difference in angle between the polarization direction and the orientation of the director of dichroic liquid crystal 52, which aligns substantially with external magnetic field 54. A substantial part of the unattenuated component of light passing through liquid crystal layer 44 is reflected back through liquid crystal layer 44 by reflecting layer 40. Further attenuation of the reflected light will occur within liquid crystal layer 44 before the attenuated and reflected light re-emerges from polarizing layer 42. Thus pixel 46 may appear bright or dark under control of the orientation of magnetic field 54.

In the display system shown in FIG. 5, incident light 70 is linearly polarized by first layer 56 and passes into liquid crystal layer 62. The orientation of the linear polarization of the light entering liquid crystal layer 62 is rotated by the helical twist of the director of liquid crystal 64. The helical twist is produced by torque resulting from anchoring director 66A to the inner surface of layer 56 and the forces produced by external magnetic field 76 on liquid crystal 64. Director 66B at the inner surface of layer 60 is weakly anchored to layer 60 so that most of span of liquid crystal 64 readily aligns with magnetic field 76. Note that the twist of the director of liquid crystal 64 need not be uniform across the span of layer 62. The pixels 68 comprising second polarizing layer 60 selectively attenuate the polarized light passed by liquid crystal layer 62 in accordance with the degree of helical twist and the particular linear polarization orientation of the individual pixels 68. Light passing through second polarizing layer 60 is reflected by layer 62 back through second polarizing layer 60, where it is further attenuated. Reflected light emanating from second polarization layer 60 is transmitted back through liquid crystal 58 and first polarizing layer 56 to an observer. Thus pixel 68 may appear bright or dark based upon the orientation of magnetic field 76.

Conclusions, Ramifications, and Scope

Accordingly, it can be seen that I have invented a convenient, easily visible, passive, robust, compact, accurate, and economical means for displaying tire pressure. Vehicular safety can be enhanced because tire pressure can be visually quickly and cleanly checked without need of attaching/detaching any external devices I have also invented a liquid crystal display scheme that responds globally a vector sum of external magnetic fields, the primary component of which is a magnetic field source located within a pressurized/evacuated vessel providing a magnetic field having an axis of symmetry rotated in a particular plane responsive to changes in pressure within the pressurized/evacuated vessel, where the magnetic filed selectively alters light polarization properties of pixels to form images.

Although the description above contains some specificity, it should not be construed as limiting the scope of the invention but as merely providing illustrations of the scope of this invention: namely utilizing of the magneto-optic properties of liquid crystals in combination with a magnetic field that changes direction responsive to a changing analog signal or parameter, to provide a passive visual indication of the change in the signal or parameter.

Various other embodiments and ramifications are possible within scope the basic invention as described above. For example, materials other than liquid crystals such as ferrofluids demonstrate a type of response to magnetic field direction as liquid crystals and have the potential to provide comparable types of passive displays.

Also there are many different mechanisms capable of varying direction or rotating a magnetic field transducing mechanical stimulus, including pressure. Furthermore, flux-guiding means, including additives to the liquid crystal material, may be employed to increase the coupling of the tangential magnetic field within the display. More complex layered structures may be enhance the quality as well as color of the visual effects magnetic field direction has on pixels making up the display including multiple polarizing and liquid crystal layers.

The references listed below present useful teachings to those wishing to become familiar with and more skilled in fields of magneto-optic effects of liquid crystal compositions and analogous materials:

S. Chandrasekhar, *Liquid Crystals*, 2nd Ed., Cambridge University Press, 1992.

P. J. Collings and M. Hird, *Introduction to Liquid Crystals—Chemistry and Physics*, Taylor and Francis, 1998.

V. G. Chigrinov, *Liquid Crystal Devices: Physics and Applications*, Artech House, 1999.

"Ferronematics: Enhanced Magneto-Optical Response of a Liquid Crystalline Systems," Burylov, S. V. and Y. L. Raikher, *Mat. Sci. Eng.* C2 (1995) 235–241.

"Static And Dynamic Behaviour of Ferronematics Under Magnetic Fields," Motoc, C., and E. Petrescu, *Modern Phys Lett.* B., 12, No 13 (1998) 529–540.

"Magnetic Field Controlled Optical Phase Retardation in a Hybrid Nematic Cell," P. Ziherl, D. Subacius, A. Strigazzi, V. M. Pergamenshchik, A. L. Alexe-Ionescu, O. D. Lavrentovich, and S. Zumer, *Liquid Crystals*, 24, no. 4 (1998) 607–612.

Thus the scope of the invention should be determined with respect to the appended claims and equivalents, rather than by the examples described above.

I claim:

1. A method for displaying magnitude changes of a property within an enclosed vessel externally, comprising the steps of:
   (a) mounting a magnetic field source for rotation within the vessel providing a magnetic field having an axis of symmetry rotating in a particular plane;
   (b) rotating the magnetic field source in opposite directions responsive to increasing and decreasing changes in magnitude of the property within the vessel, respectively;
   (c) passively sensing orientation of the axis of symmetry of the magnetic field source outside the vessel with a planar display located in a plane parallel and proximate to the plane of rotation of the magnetic field source, the planar display having a plurality of pixels formed by magneto-optic materials each providing a visual effect representative of orientation of the axis of symmetry of the magnetic field; and
   (d) correlating the orientation of the axis of symmetry of the magnetic field sensed to increases and decreases in magnitude of the property within the vessel.

2. The method of claim 1 wherein each pixel formed by the magneto-optic materials comprises in combination,
   (i) a top light polarizing layer;
   (ii) an intermediate magneto-optic layer mixture composed of liquid crystal materials having dichroic (polarization dependent) light absorption properties; and
   (iii) a bottom light reflecting layer, and
   (iv) a source of light illuminating the planar display.

3. The method of claim 2 wherein each pixel formed by the magneto-optic materials further includes,
   (v) a bottom light polarizing layer interposed between the bottom light reflecting layer and the intermediate magneto-optic layer mixture.

4. The method of claim 2 or 3 wherein the liquid crystal materials are from types of liquid crystal materials classified as smectic and nematic.

5. The method of claim 4 wherein the liquid crystal materials further include a property of classes of properties described as discotic and chiral.

6. The method of claim 4 wherein the magneto-optic layer mixture composed of liquid crystal materials further includes a ferronematic compound.

7. A method as recited in claim 1 or 3 wherein the vessel is a pneumatic tire and a wheel rim for a vehicle and the magnetic field source is rotated in opposite directions responsive to increasing and decreasing changes in pressure.

8. A method as recited in claim 7 the planar display provides a visual warning of insufficient pressure.

9. A method as recited in claim 7 wherein the planar display provides a visual warning of excessive pressure.

10. A method as recited in claim 7 wherein the planar display provides a visual indication of pressure within the container in a plurality of discrete ranges.

11. An apparatus for displaying magnitude changes of a property within an enclosed vessel externally, comprising in combination:
    (a) a magnetic field source mounted for rotation within the vessel, the magnetic field source providing a magnetic field having an axis of symmetry rotating in a particular plane upon rotation of the field source;
    (b) means within the vessel for rotating the magnetic field source in opposite directions responsive to increasing and decreasing changes in magnitude of the property within the vessel, respectively;

(c) a planar display located in a plane parallel and proximate to the plane of rotation of the magnetic field source outside the vessel, the planar display having a plurality of pixels formed by magneto-optic materials each passively providing a visual effect representative of orientation of the axis of symmetry of the magnetic field; and (d) correlating the orientation of the axis of symmetry of the magnetic field sensed to increases and decreases in magnitude of the property within the vessel.

12. The apparatus of claim 11 wherein each pixel formed by magneto-optic materials comprises in combination:

(i) a top light polarizing layer;

(ii) an intermediate magneto-optic layer mixture composed of liquid crystal materials having dichroic (polarization dependent) light absorption properties; and (iii) a bottom light reflecting layer, and (iv) a source of light illuminating the planar display.

13. The apparatus of claim 12 wherein each pixel formed by the magneto-optic materials further includes, (v) a bottom light polarizing layer interposed between the bottom light reflecting layer and the intermediate magneto-optic layer mixture.

14. The apparatus of claim 11 or 12 wherein the liquid crystal materials are from types of liquid crystal materials classified as smectic and nematic.

15. The apparatus of claim 14 wherein the liquid crystal materials further include a property of classes of properties described as discotic and chiral.

16. The apparatus of claim 14 wherein the magneto-optic layer mixture composed of liquid crystal materials further includes a ferronematic compound.

17. The apparatus of claim 14 wherein the vessel is a pneumatic tire and a wheel rim for a vehicle and the magnetic field source is rotated in opposite directions responsive to increasing and decreasing changes in pressure.

18. The apparatus of claim 17 wherein the planar display provides a visual warning of insufficient pressure.

19. The apparatus of claim 17 wherein the planar display provides a visual warning of excessive pressure.

20. The apparatus of claim 7 wherein the planar display provides a visual indication of pressure within the container in a plurality of discrete ranges.

21. The apparatus of claim 11 wherein the means within the vessel for rotating the magnetic field source in opposite directions responsive to increasing and decreasing changes in magnitude of the property within the vessel, respectively, comprises a pressure actuated bladder mechanism mounted within the pressure vessel coupled for rotating the magnetic field source responsive to changes in fluid pressure within the vessel.

22. The apparatus of claim 21 wherein the pressure actuated bladder mechanism comprises in combination, (i) a fixed radius outer cylindrical wall integral with an inner wall of the vessel;

(ii) a variable radius flexible inner cylindrical wall;

(iii) flexible annular end walls radially between the fixed radius outer cylindrical wall and the variable radius flexible inner cylindrical wall;

the outer cylindrical wall, the flexible inner cylindrical wall and the flexible annular end walls defining a hermetic, annular bladder chamber;

(iv) a bladder fluid establishing a reference fluid pressure within the bladder chamber;

(v) means coupling between the flexible inner cylindrical wall of the bladder chamber and the magnetic field source, whereby, increasing changes in fluid pressure within the vessel increase radius of the inner cylindrical wall of the bladder chamber rotating the magnetic field source in a first direction, and decreasing changes in fluid pressure within the vessel decrease radius of the inner cylindrical wall of the bladder chamber rotating the magnetic field source in a second direction opposite the first direction.

23. The apparatus of claim 22 wherein the means coupling between the between the flexible inner cylindrical wall of the bladder chamber and the magnetic field source comprise in combination, (vi) a shaft longitudinally aligned within, surrounded by the annular bladder chamber having the magnetic field source secured at a proximate end adjacent the inner wall of the vessel;

(vii) a plurality of spiral spokes coupled to and radially winding around the shaft each spoke having a distal end coupled to the flexible inner cylindrical wall of the bladder chamber, increases in radius of the flexible inner cylindrical wall of the bladder chamber unwinding the spiral spokes from around the shaft, rotating the shaft in the first direction, decreases in radius of the flexible inner cylindrical wall of the bladder chamber winding the spiral spokes around the shaft, rotating the shaft in the second direction.

24. The apparatus of claim 22 wherein the means coupling between the between the flexible inner cylindrical wall of the bladder chamber and the magnetic field source comprise in combination, (vi) a shaft longitudinally aligned and journalled for rotation within, and surrounded by the annular bladder chamber having the magnetic field source secured at a proximate end adjacent the inner wall of the vessel;

(vii) a spiral spoke coupled to and radially winding around the shaft having a distal end coupled to the flexible inner cylindrical wall of the bladder chamber, increases in radius of the flexible inner cylindrical wall of the bladder chamber of the bladder unwinding the spoke from around the shaft, rotating the shaft in the first direction, decreases in radius of the flexible inner cylindrical wall of the bladder chamber winding the spiral spoke around the shaft rotating the shaft in the second direction.

25. The apparatus of claim 23 or 24 wherein each spiral spoke has a spring constant and tends to expand the spiral increasing the radius of the flexible inner cylindrical wall of the bladder.

26. The apparatus of claim 23 or 24 wherein each spiral spoke has a spring constant and tends to contract the spiral decreasing the radius of the flexible inner cylindrical wall of the bladder.

27. The apparatus of claim 23 wherein:

at least one spiral spoke has a spring constant and tends to expand its spiral unwinding from around the shaft increasing the radius of the flexible inner cylindrical wall of the bladder, and at least another spiral spoke has a spring constant and tends to contract its spiral winding around the shaft, decreasing the radius of the flexible inner cylindrical wall of the bladder.

* * * * *